United States Patent

Boudy et al.

[11] Patent Number: 5,889,857
[45] Date of Patent: Mar. 30, 1999

[54] ACOUSTICAL ECHO CANCELLER WITH SUB-BAND FILTERING

[75] Inventors: Jérôme Boudy, Fontenay le Fleury; François Capman, Versailles, both of France

[73] Assignee: Matra Communication, France

[21] Appl. No.: 702,484
[22] PCT Filed: Dec. 27, 1995
[86] PCT No.: PCT/FR95/01743
§ 371 Date: Aug. 28, 1996
§ 102(e) Date: Aug. 28, 1996
[87] PCT Pub. No.: WO96/21313
PCT Pub. Date: Jul. 11, 1996

[30] Foreign Application Priority Data

Dec. 30, 1994 [FR] France ................................. 94 15951

[51] Int. Cl.⁶ ............................. H04M 1/00; H04M 9/08
[52] U.S. Cl. .......................... 379/410; 379/411; 370/291
[58] Field of Search .................. 379/406, 410, 379/411; 370/289, 290, 291

[56] References Cited

U.S. PATENT DOCUMENTS

| | | | |
|---|---|---|---|
| 4,057,696 | 11/1977 | Gitlin et al. | 379/411 |
| 4,117,277 | 9/1978 | Van Den Elzen et al. | 379/406 |
| 4,697,261 | 9/1987 | Wang et al. | 370/289 |
| 4,920,530 | 4/1990 | Wouda et al. | 370/291 |
| 4,956,838 | 9/1990 | Gilloire et al. | 370/291 |
| 5,014,232 | 5/1991 | Andre | 364/724.19 |
| 5,042,026 | 8/1991 | Koike et al. | 370/291 |

OTHER PUBLICATIONS

ICASSP–90, vol. 2, Apr. 3–6, '90, Albuquerque, New Mexico, U.S.A., pp. 1145–1148, XP000146973 Birger Hätty: "Recursive least squares algorithms using multirate systems for cancellation of acoustical echoes"—see whole document.

ICASSP–94, vol. 2, Apr. 19, '94–1922 Adelaide, South Australia, pp. 265–268, XP002001154, M.G. Siqueira et al.: "New adaptive–filtering techniques applied to speech echo cancellation"—see whole document.

1992 IEEE International Symposium on Circuits and Systems, vol. 4/6, May 10, '92, San Diego, Ca, U.S.A. pp. 1918–1921, XP000338368, R. Wehrmann: "Concepts of improving hands–free speech communication"—see whole document.

Proceedings of Eusipco–88, vol. 2, Sep. 5–8, '88, Grenoble, France, pp. 491–494, XP000186362, A. Gilloire et al.: "Achieving the control of the acoustic echo inaudio terminals"—see whole document.

Bellanger et al. FLS–QR algorithm for adaptive filtering. The case of multichannel signals, Signal Processing v. 22 n 2, p. 115–126, Feb. 1991.

Bellanger, FLS–QR algorithm for adaptive filtering, Signal Processing v 17 n 4, p.291–304, Aug. 1989.

Bellanger, Computational Complexity and Accuracy Issues in Fast Least Squares Algorithms for Adaptive Filtering, Pro. of the 1988 Int. Sym. on Circuits & Systems, vol.3, p.2635–2639, Jun. 1988.

Primary Examiner—Ahmad F. Matar
Assistant Examiner—Charles N. Appiah
Attorney, Agent, or Firm—Evenson, McKeown, Edwards & Lenahan, P.L.L.C.

[57] ABSTRACT

The echo canceller is designed to be placed between a hands-free acoustical interface and a communications network. It comprises a plurality of processing paths connected in parallel and each allocated to one of a plurality of adjacent sub-bands taken from the spectrum band of the output signal. Each path comprises an analysis filter receiving the echo-containing signal for transmission after correction, a second analysis filter receiving the incoming signal coming from the network, and feeding an adaptive filter that supplies an estimated echo in the respective sub-band to the subtractive input of the subtracter and a synthesis filter. The adaptive filters in at least some of the sub-bands implement a QR decomposition RLS algorithm on the incoming signal, using the fast version thereof, with or without recursive order.

10 Claims, 2 Drawing Sheets

ACOUSTICAL ECHO CANCELLER WITH SUB-BAND FILTERING

BACKGROUND OF THE INVENTION

The present invention relates to echo cancellers for use in telephone installations. A major application lies in installations likely to include portable terminals or "hands-free" terminals. Such installations include, in particular, digital cellular radiotelephone systems, videophone terminals operating in narrow band (8 kHz) or in enlarged band (16 kHz), and terminals for the conventional wire network.

The principle of an echo canceller is illustrated in FIG. 1 of the present application. FIG. 1 shows a "near" terminal which may be a teleconferencing set, a "hands-free" telephone handset, etc. The signal x travelling over a receive line LR and coming from a remote terminal 8 is amplified by an amplifier 10 and then broadcast by a loudspeaker 12. The soundwaves coming from the loudspeaker 12 are transmitted by acoustical coupling (represented by path 13) to one or more microphones 14 that are intended for picking up speech of a near speaker. The microphone 14 is connected to an amplifier 16 and the output signal z is transmitted over a send line LE to the remote terminal. The "remote" speaker placed at the remote terminal 8 will consequently hear not only any intended speech, but also an echo of his or her own speech after a delay due to the transmission time via the channels LE and LR, and disturbed by the transfer function of the acoustical path 13.

The echo canceller includes an adaptive filter FA which receives the input signal x and whose output is applied to the subtractive input of a subtracter 18 whose additive input receives the output from the amplifier 16. The coefficients of the filter FA are automatically adapted responsive to the error signal e sent over the send line LE and equal to the difference between the signal z (constituted by the echo when there is no useful signal) and the output from the filter. When the speaker at the near terminal is not speaking, the error signal is constituted merely by residual echo. Often the echo canceller is provided with a detector for detecting the presence of near speaker speech, referred to as a double speech detector (DIP), which stops or slows down adaptation of the filter FA while the local speaker is speaking, so as to prevent the filter from being disturbed by local speech.

In general, the filters of echo cancellers in telephone installations are digital adaptive transversal filters using a simple algorithm such as the gradient algorithm or more commonly the normalized stochastic gradient algorithm, referred to as NLMS.

A major problem in implementing an echo canceller is due to the large number of coefficients required for taking account of the length of the impulse response of the path 13 throughout the telephone band. Several thousands of coefficients are required at the usual sampling frequency of 8 kHz (narrow band) or of 16 kHz (enlarged band). To keep the volume of computation compatible with the computation power of available digital signal processors, proposals have been made to subdivide the passband in which echo cancelling is to be performed into a plurality of sub-bands, each processed by a path having a sub-band analysis filter, a canceller allocated to the sub-band, and a sub-band synthesis filter.

This approach encounters difficulties. Either the filters are designed so that the sub-bands are separate, thereby avoiding spectrum aliasing effects in each sub-band, but causing gaps in the spectrum of the signal as reconstructed by combining the outputs of the synthesis filterbank. Or else, a sub-band-feeding sub-sampling frequency is adopted which is greater than the critical frequency for sub-sampling or decimation in order to form guard bands which avoid spectrum aliasing, but that considerably increases the computation speed required. Or else the sub-bands are allowed to overlap and account is taken of the contribution of adjacent sub-bands in the path allocated to any one sub-band. This solution (U.S. Pat. No. 4,956,838) gives results that are satisfactory, but it suffers from the drawback of considerably complicating the structure of an echo canceller.

It is also known that the algorithms conventionally used in echo cancellers, and in particular the stochastic gradient algorithm, allows significant residual echo to remain in a noisy environment.

A certain number of filtering algorithms are known that make it possible, in theory, to reduce the residual error. In particular, the recursive least squares algorithm or RLS algorithm is known which gives better performance than the NLMS algorithm commonly used in echo cancelling. However it suffers from the drawback of being complex and of having zones of instability. That is why it has not been used in acoustical echo cancellers, in particular because the complexity of implementing it would require a large amount of hardware and computation times that are incompatible with the delays that are acceptable in telephone communications. For example, in the European GSM standard for digital cellular telephony, the maximum processing time allowed to a station is 0.1 s.

SUMMARY OF THE INVENTION

It is an object of the invention to provide an echo that makes it possible to reduce the error e to a value that is very small, while nevertheless retaining acceptable complexity and processing time.

To do this, it has been necessary firstly to make a certain number of observations.

The first observation is that it is possible to reduce the complexity of computation quite considerably by combining the use of sub-band processing with a fast version of the QR decomposition least squares algorithm, which has particularly satisfactory digital properties (robustness with finite precision, stability), while maintaining the effectiveness of the least squares algorithm, with each sub-band being fed by under-sampling. This advantage is particularly clear if an algorithm is used that is recursive on order. The second observation is that the effectiveness of the QR algorithm is such that the contribution of the sub-bands on either side becomes negligible, even when the bands overlap in part, thereby avoiding the presence of gaps in the reconstructed spectrum but without needing the complexity required for filters that take account of the contribution from the sub-bands on either side.

Consequently, the present invention proposes an echo canceller designed for use between a hands-free acoustical interface and a telecommunications network, the canceller comprising a plurality of processing paths connected in parallel and each allocated to one out of a plurality of adjacent sub-bands in the spectrum band of the output signal, each path comprising a sub-band analysis filter receiving the echo-containing signal that is to be delivered after echo correction, a second sub-band analysis filter receiving the incoming signal and feeding an adaptive filter implementing a fast version of a least squares algorithm based on the QR decomposition of incoming signal, which is recursive on order (commonly called "fast QR-LSL") or non-recursive on order (commonly called "fast QR-RLS")

and providing an estimated echo in the respective sub-band to the subtractive input of the subtracter, and a sub-band synthesis filter. Any solution of intermediate order is also possible. The network may, in particular, be a GSM network, an RTC network, etc.

Very often, the echo phenomenon is not of the same magnitude in all of the sub-bands. For example, in some installations, the echo phenomenon is much more intense and must be corrected much more completely in low frequency sub-bands or in mid frequency sub-bands. Under such circumstances, it is possible to use filters implement the QR decomposition least squares algorithm in those sub-bands which are most affected by echo, while the filters allocated to the other sub-bands can implementing a simpler algorithm, e.g. the stochastic gradient algorithm NLMS, or even the sign algorithm.

In practice, the telephone band is subdivided into a number of sub-bands lying in the range four to eight for narrow band signals (8 kHz) and four to sixteen for signals in enlarged band (16 kHz). Above eight, the sub-sampling rates achieved are too small compared with the common full band sampling rates for 8 kHz and 16 kHz (narrow band and enlarged band). In addition, the additional improvement that can be expected does not justify the increased complexity. The total length of the filters (number of taps or order of the filters) generally lies in the range 64 to 300 for a hands-free terminal placed in a vehicle and between 256 and 512 for a hands-free terminal placed in a room, when dealing with narrow band signals. For enlarged band signals (16 kHz), these orders of magnitude are generally doubled.

It has been observed that beyond these values, the reduction that can be hoped for decreases only very slowly, unless filters are used that are three or four times longer.

The invention will be better understood on reading the following description of particular embodiments given as non-limiting examples. The description refers to the accompanying drawings.

DETAILED DESCRIPTION

Figure 1:
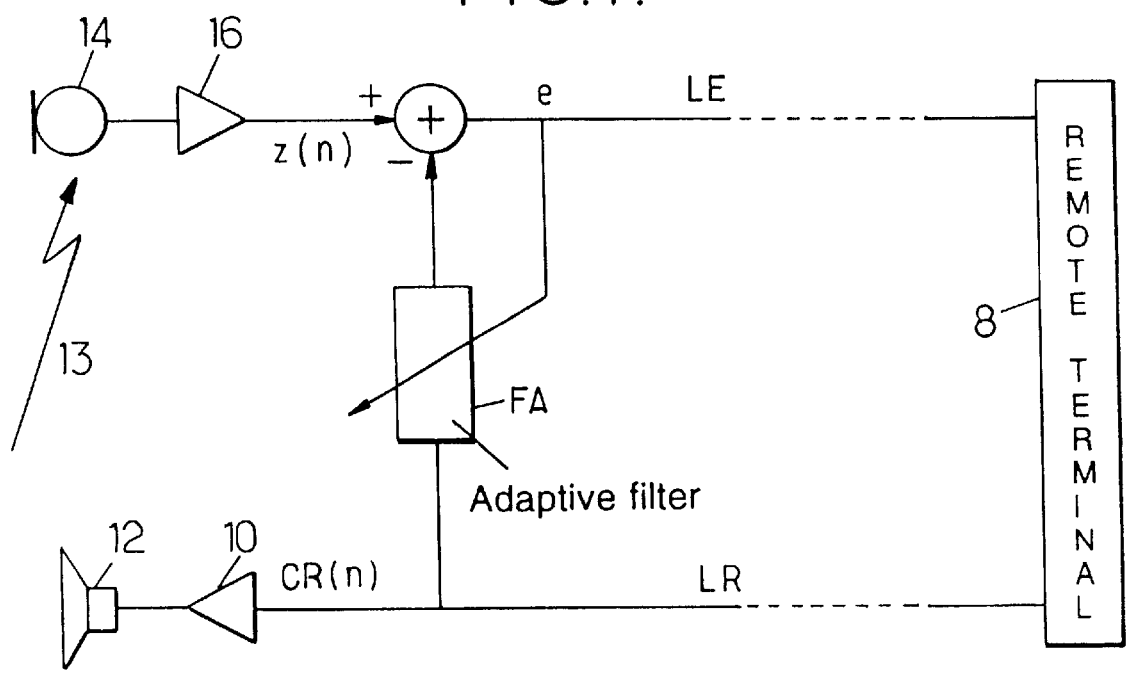
FIG. 1, already mentioned, shows the principles on which an echo canceller is based.

Before describing the invention, information about echo cancellers as used in telephony and the notation that will be used will be summarized. The following notation is used:

x(n): incoming signal at instant $t_n$ (sample n)

z(n): echo e(n): residual signal at instant n, assuming that there is no local speech (residual error)

h: transverse filter of the echo canceller $X_{n+1,N}(n)$: the matrix (n+1) rows and N columns matrix at instant n of the form:

$$X(n) = \begin{bmatrix} x(0) & 0 & \ldots & \ldots & 0 \\ x(1) & x(0) & . & \ldots & 0 \\ & \ldots & \ldots & \ldots & \\ x(n) & \ldots & \ldots & \ldots & x_{n-N+1} \end{bmatrix}$$

$Z_{n+1,1}(n)$: the echo matrix at instant n, of the form:

$$Z(n) = \begin{bmatrix} \lambda^{n/2}z(0) \\ \lambda^{(n-1)/2}z(1) \\ \hdashline \lambda^{1/2}z(n-1) \\ \lambda z(n) \end{bmatrix}$$

where $\lambda$ is a forgetting factor $E_{n+1,n}(n)$: the column matrix of the residual signals: e(0), ..., e(n).

Using the conventional least squares algorithm, referred to as the RLS algorithm, and in the absence of local speech, attempts are made to minimize the output variance estimator:

$$E(n) = \sum_{i=0}^{n} \lambda^{n-i}[z(i) - H^t(n) \cdot X(i)]^2$$

which can be written in the following form, using matrix notation:

$$E_{n+1,n}(n) = Z_{n+1,1}(n) - X_{n+1,N}(n).H$$

As mentioned above, the invention makes use of a QR type decomposition of the input signal, implementing an orthogonal transformation matrix Q (i.e. in which the product when multiplied by its transpose is equal to the identity matrix), having n+1 rows and n+1 columns, making it possible to obtain a higher triangular matrix R(n) having N rows and N columns, by applying the following relationship at instant n:

$$Q_{n+1,n+1}(n) \cdot X_{n+1,N}(n) = \begin{bmatrix} R_{N,N}(n) \\ O_{n-N+1,N} \end{bmatrix} \quad (2)$$

This transformation makes it possible to adapt the filter by a process of continuously updating the QR decomposition.

Minimization in the least squares sense is performed by applying the QR transformation to equation (1); calculation shows that the orthogonal matrix Q satisfies the following updating relationship:

$$\begin{bmatrix} Q_{n,n}(n-1) & o_{n,1} \\ o^t_{n,1} & 1 \end{bmatrix} x_{n+1,N}(n) = \begin{bmatrix} \lambda^{1/2}R_{N,N}(n-1) \\ o_{n-N,N} \\ x(n)x(n-1)\ldots x(n-N+1) \end{bmatrix}$$

It can be seen that it is possible to obtain the matrix Q(n) from the estimated preceding transform matrix Q(n−1) and a set of N Givens' rotations enabling the last line of the input signal matrix to be eliminated:

$$Q_{n+1,n+1}(n) \cdot \hat{Q}_{n+1,n+1}(n) = \begin{bmatrix} Q_{n,n}(n-1) & o_{n,1} \\ O^t_{n,1} & 1 \end{bmatrix} \quad (4)$$

where $\hat{Q}(n)$ designates the product of N consecutive Givens' rotations:

$$Q_{n+1,n+1}(n) = Q\Theta_{N-1} \ldots Q\Theta_Q$$

The rotation $\Theta_i$ serves to eliminate sample x(n−i) in the matrix:

$$Q\Theta_i \begin{bmatrix} \text{Column: 1} & & i & & & \text{row} \\ 1 \text{------} & \cdot & \text{------} & & & \ldots 1 \\ \backslash & \cdot & 0 & & & \\ & \backslash & \cdot & & & \\ & & 1 & \cdot & & \\ & & \cos\,\theta_i & & \sin\,\theta_i & \ldots i \\ & & \boxed{\begin{matrix} 1 & & 0 \\ & \backslash & \\ 0 & & 1 \end{matrix}} & & & \\ & & \sin\,\theta_i & & \cos\,\theta_i & \end{bmatrix}$$

Finally, by retaining only the rows and columns that relate to N rotations, an updating formula is reached that defines the orthogonal transform matrix $Q\Theta_{N+1,N+1}$:

$$Q\Theta_{N+1,N+1}(n) \begin{bmatrix} \lambda^{1/2} R_{N,N}(n-1) \\ x(n)x(n-1)\ldots\ x(n-N+1) \end{bmatrix} = \begin{bmatrix} R_{N,N}(n) \\ O_{1,N} \end{bmatrix}$$

It is possible to evaluate the a posteriori residual error e(n) which is the last term of vector E:

$$e(n) = E^t_{n+1,1}(n)[O, \ldots, 0, 1]^t$$

which can also be written as follows, using $E_q$ to designate the vector that results from the orthogonal transform of E by Q:

$$e(n) = Eq^t_{n+1,1}(n) \cdot Q_{n+1,1}(n)[O, \ldots, 0, 1]^t$$

It can be shown that e(n) is equivalent to:

$$e(n) = e_q(n)\gamma N-1(n)0$$

where $e_q(n)$ is the last term of $E_q(n)$ $\gamma_{N-1}$ is equal to:

$$\gamma_{N-1}(n) = \prod_{i=0}^{N-1} \cos\theta_i(n)$$

Θ being the normalized Givens' rotation angle.

Computing the a priori residual error in turn leads to evaluating it as $\epsilon(n)=eq(n)/\gamma(n)$ when γ is the square root of the likelihood variable.

$$\lambda^2(n) = e(n)/\epsilon(n)$$

An estimate of the last term eq(n) of the error vector after rotation could be the geometric mean of the a priori and a posteriori errors.

Proposals have already been made to implement a fast QR-RLS algorithm in fields other than acoustical echo cancelling, so it is not described in detail. Reference may be made on this respect to articles such as:

Ling, "Givens' rotation based least squares lattice and related algorithms", IEEE Trans. on Signal Processing, Vol. 39, No. 7, July 1991.

Regalia et al., "On the duality between fast QR methods and lattice methods in least squares adaptive filtering", IEEE Trans. on ASSP, Vol. 39, No. 4, pages 879–891, April 1991.

B. Yang, J. F. Bohme, "Rotation based RLS algorithms: unified derivations, numerical properties, and parallel implementations", IEEE Trans. on Signal Processing, Vol. 40, No. 5, May 1992.

The "fast" algorithms reduce the complexity of filters which is normally of the form $O(N^2)$ where N is the order of the adaptive filter, reducing it approximately to O(N).

On this topic, it may also be useful to provide information on the evolution of the algorithm from complexity in $O(N^2)$ to complexity in O(N).

The direct QR decomposition applies to the Cholesky factor of the self-correlation matrix, whereas the inverse decomposition is applied to the inverse of the Cholesky factor. This distinction is the starting point for two families of least squares algorithms based on the QR decomposition.

The corresponding initial algorithms are in $O(N^2)$, and they are called respectively QR-RLS and IQR-RLS.

For each of those two families there exist fast versions in O(N), either of fixed order or else recursive on order.

In the context of direct QR decomposition, mention may be made of the Cioffi algorithm which is of the FQR-RLS (fast QR-RLS) type of fixed order, and of the Regalia & Bellanger algorithm of the FQR-LSL (fast QR least square lattice) type of recursive order described in the above article.

For inverse QR decomposition, a derivation for each case (fixed order and recursive order) can be found in Theodoridis (ICASSP-95).

There also exists an algorithm based on QR methods but using the Householder transform instead of fast version direct QR type Givens' rotations, but which differs from the other algorithms mentioned above by the fact that it identifies the transverse filter. Such an algorithm is described by Liu in an article published in IEEE Trans. on SP, March 1995.

Consequently, a description will be given of examples of distribution of the functional blocks required for implementing particular embodiments.

Figure 2:
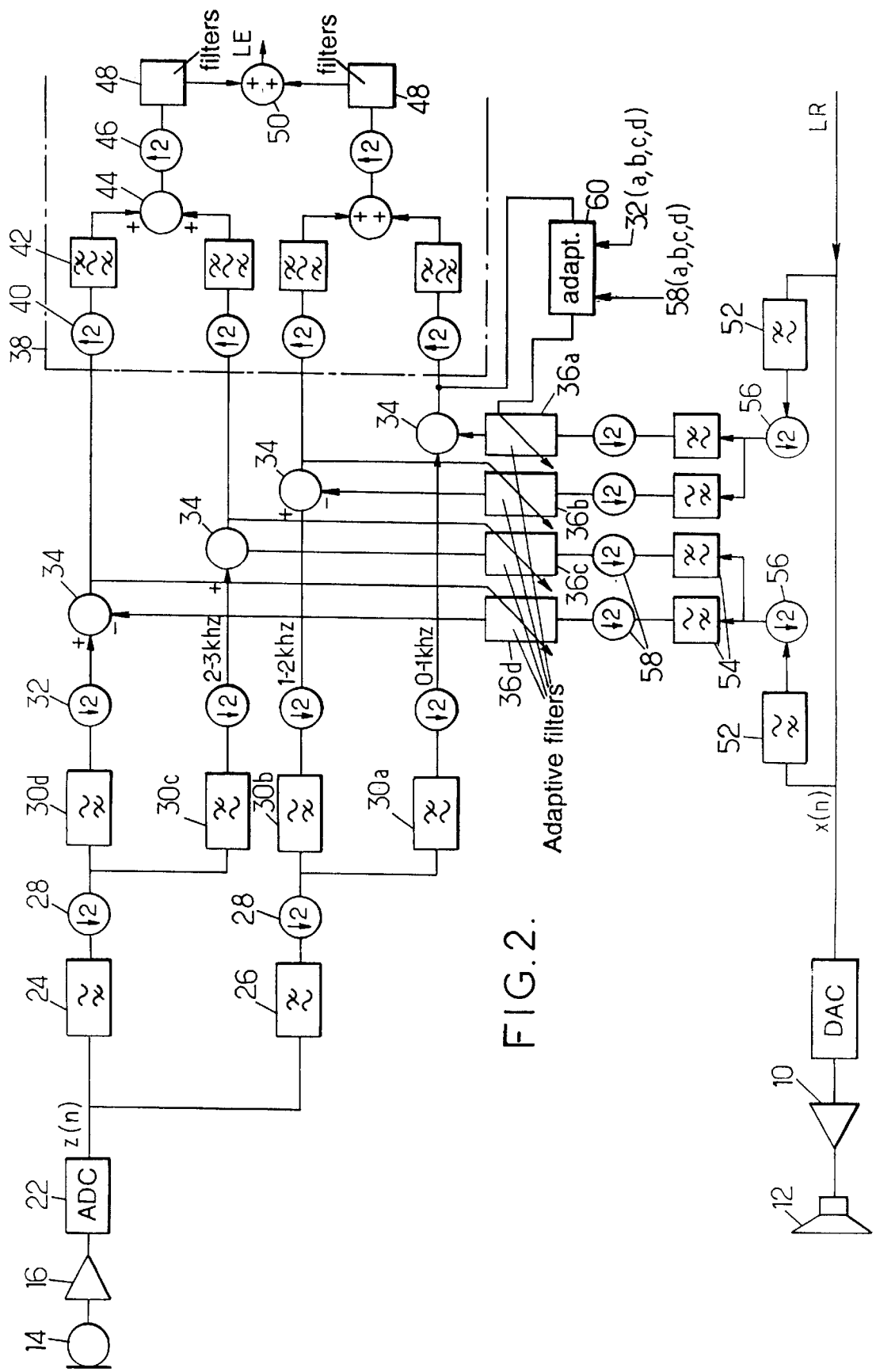
FIG. 2 is a block diagram showing one possible structure for an echo canceller of the invention.

The echo canceller shown diagrammatically in FIG. 2 makes use of a four sub-band division into four sub-bands. Elements corresponding to elements of FIG. 1 are designated by the same reference numbers. It is assumed below that the canceller is for use in a hands-free telephone installation designed to operate in the band extending from 300 Hz to 3.4 kHz, with sampling at 8 kHz, it being understood that such a method can be used with hands-free terminals with enlarged bandwidth (16 kHz), and with processing being performed in other numbers of sub-bands.

The canceller comprises an input analog-to-digital converter 22 which feeds two parallel-connected filters 24 and 26. The filter 24 is a highpass or bandpass filter, e.g. having a low cutoff frequency of about 2 kHz. The filter 26 is a lowpass filter, having substantially the same cutoff frequency, so as to avoid overlap between bands. Each of the filters 24 and 26 is followed by a sub-sampling circuit 28 designed to perform decimation with a ratio of 2 and to direct the samples to each of two sub-band analysis filters. Thus, using filters 30a, 30b, 30c, and 30d, four sub-bands are thus constituted which extend, for example, respectively up to 1 kHz, from 1 kHz to 2 kHz, from 2 kHz to 3 kHz, and from 3 kHz to 4 kHz.

The filters 30 may be of conventional type. In particular, it is possible to use conjugate quadrature filters (CQF), or quadrature mirror filters (QMF), and infinite impulse response filters (IIR). It is also possible to use wavelet decomposition filters (WDF) which enable a finer division to be obtained.

Each of the filters 30 is followed by a sub-sampler 32 and by a subtracter 34 which receives the output from a respective cancelling filter 36a, 36b, 36c, or 36d.

To carry out analysis and synthesis of the signal in sub-bands, it is possible to use sub-band decomposition and recomposition schemes other than binary tree recomposition as described above. For example, it is possible to select decomposition by means of banks of filters that may or may not be modulated or uniform, and which do not restrict the choice of structure for decomposition into sub-bands.

As mentioned above, it is often advantageous to perform QR-RLS type filtering in the lower band only, i.e. in the sub-bands fed by the filters 30a and 30b. In contrast, the filters 36c and 36d (higher band) can implement a normalized LMS algorithm which requires much less computation power. The QR decomposition least squares algorithm may be implemented only in the two middle sub-bands.

More generally, it is possible to use the QR decomposition least squares algorithm for the adaptive filters of sub-bands having high input signal energy and a less complex algorithm (e.g. NLMS) in the sub-bands having lower energy. Choices can be made after prior analysis of the input signal mean energy levels in each of the sub-bands in the type of decomposition under consideration.

The subtracters 34 feed a synthesis circuit 38 that is symmetrical to the analysis circuits. In the example shown, it comprises over-samplers 40 operating by adding zeros and interpolating, bandpass filters 24, adders 44, another bank of over-samplers 46, two output filters 48, and an adder 50 providing e(n).

The adaptive filters 36a to 36d which feed the subtractive inputs of the subtracters 34 receive the signal x(n) distributed into sub-bands by two successive banks of filter 52 and 54 and two banks of sub-samplers 56 and 58 having the same characteristics as the filters and sub-samplers used for analysis z(n). The total number of adaptive filter taps, i.e. the order of the filters, generally lies in the range 64 to 256, which larger number has been found to be sufficient even in a teleconference installation in a room of large size, having long reverberation times, providing a sufficient level of sub-band decomposition is used in that case. The distribution of coefficients between the various sub-bands will generally be equal, insofar as all of the sub-bands implement the same algorithm. In contrast, the greater complexity of the QR-RLS algorithm can lead to unequal distribution between the sub-bands using that algorithm and the sub-bands using an algorithm that requires less complex computation. For example, if the canceller subdivides into four sub-bands, two of which use the QR decomposition least squares algorithm, then sixteen coefficients may be allocated to each of those sub-bands and thirty-two coefficients to the other two sub-bands. This brings the computation times for the various adaptive filters closer together. In general, implementation can thus be performed by implementing the adaptive filters on signal processors that are now available on the components market.

The forgetting factor of the QR decomposition least squares algorithm which is involved in the recursive computation can be given a fixed value. In practice, it is necessary for the forgetting factor to be greater than $(n-1)/n$ where n is the number of coefficients in the filter under consideration.

Unlike fast transversal RLS algorithms where the value of the forgetting factor must be large enough for avoiding divergence, QR decomposition least squares algorithms (whether fast version or not) make it possible to use a much more flexible adjustment range for the forgetting factor without any risk of divergence or of instability.

Consequently, it is preferable to provide the filters with adaptation means 60 for adapting the forgetting factor. In FIG. 2, such means 60 are only shown for the adaptive filters 36a and 36b. The adaptation means may be generalized to the filters 36c and 36d implementing the NLMS algorithm, where similar control of the adaptation step size may be necessary or preferable.

A strategy which is generally advantageous consists in giving λ a value that is initially as small as possible so as to accelerate convergence, i.e. a value that is slightly greater than $(n-1)/n = 15/16 = 0.93$ in the case considered above. The means 60 may be designed to be controlled by a double speech detector and a room noise detector that are responsive, for example, to a level of signal z(n) as compared to the level of signal x(n) being greater than a given threshold. By adopting a value close to 1 for λ when double speech is detected, it is possible to reduce disturbances in the adaptation due to the local speaker, given the remanence that introduces.

Yet another strategy for choosing λ consists in storing, in the means 60 a relationship for selecting λ over a few values from $(n-1)/n$ to a value close to 1, e.g. as a function of the energy of the signal.

The means 60 used for adjusting the parameters of the QR decomposition least squares algorithm, such as the forgetting factor λ and the order of the filter, can be based either on simple principles of energy criteria, or else on spectral distortion computations which may be parametric or otherwise (e.g. the Itakura distance, cepstral distances between the incoming signal paths taken at the outputs of 58 (a, b, c, and d) and the outgoing signal paths of 32 (a, b, c, and d) respectively). The means 60 may also be used for adjusting the adaptation step size of the NLMS algorithm.

It has been found that increasing the number of taps does not give rise to a significant improvement in echo cancelling unless the number of taps exceeds about 1000 which gives rise to computation complexity and sampling rates that are excessive.

Advantageously, the filters that implement the NLMS algorithm in some of the sub-bands include means for adjusting the adaptation step size or the convergence step size.

Means, not shown, may also be used to adjust the order of the filter automatically in each sub-band as a function of the energy of the input signal x(n) in each sub-band so as to ensure greater robustness in the presence of double speech and in the presence of noise. A strategy for selecting filter order is as follows: for a signal of zero energy in a sub-band, the adjustment means reduce the order of the filter to zero. When the signal exceeds a threshold, corresponding practically to the maximum energy envisaged in the sub-band, the adjusting means give the corresponding filter a maximum order. At intermediate energies, filter order can be adjusted in a plurality of successive steps, e.g. simulating an exponential relationship similar to that of the acoustical impulse response.

The invention can achieve effectiveness, as measured under the conditions laid down by the ERLE (echo return loss enhancement) standard of about 30 dB for 256 taps. Doubling the number of taps does not provide significant improvement.

The invention is not limited to the particular embodiment described by way of example. In particular, the number of sub-bands could be different, even though as a general rule it is pointless to have more than sixteen sub-bands for narrow bandwidth or thirty-two sub-bands for enlarged bandwidth. It is also possible to use different algorithms with a distribution different from that given above.

We claim:

1. An echo canceller for use between a hands-free acoustical interface having a local source and loudspeaker means and a communication network, for cancelling an acoustical echo due to acoustical coupling between said local source and said loudspeaker means, comprising a plurality of processing paths connected in parallel relation and each allocated to one of a plurality of mutually adjacent frequency sub-bands of a frequency spectrum band of a signal originating from said local source and to be delivered to the communication network, wherein each of said path comprises:

- a first analysis filter connected to receive an echo-containing signal originating from said local source, to be transmitted to said communication network after echo correction,
- a second analysis filter connected to receive an incoming signal originating from the communication network and directed to said loudspeaker means,
- an adaptive filter connected to receive an output of said second analysis filter and constructed to supply an estimated echo in the respective one of said sub-bands as defined by the respective first analysis filter and the respective second analysis filter, and
- a subtractor having an input connected to receive the echo containing signal in the respective sub-band and a subtractive input connected to receive said estimated echo in the respective sub-band,
- said echo canceller further comprising:
  - a synthesis filter connected to receive outputs of all said subtractors,
  - wherein said adaptive filters in those of the sub-bands having maximum incoming signal energy are arranged to carry out a fast version QR decomposition least squares algorithm on the incoming signal, while the adaptive filters of the other sub-bands implement a different algorithm.

2. An echo canceller according to claim 1, wherein those of the adaptive filters which are assigned to the mid sub-bands implement said QR decomposition algorithm, the other adaptive filters implementing the normalized least squares algorithm or the normalized stochastic gradient algorithm.

3. An echo canceller according to claim 1, wherein said QR decomposition least squares algorithm is recursive on order.

4. An echo canceller according to claim 1, wherein said QR decomposition least squares algorithm is non-recursive on order.

5. An echo canceller according to claim 1, wherein those of said adaptive filters which are assigned to low frequency sub-bands implement said QR decomposition algorithm while the other adaptive filters implement the normalized stochastic gradient NLMS algorithm.

6. An echo canceller for use between a hands-free acoustical interface having a local source and loudspeaker means and a communication network, for cancelling an acoustical echo due to acoustical coupling between said local source and said loudspeaker means, comprising a plurality of processing paths connected in parallel relation and each allocated to one of a plurality of mutually adjacent frequency sub-bands of a frequency spectrum band of a signal originating from said local source and to be delivered to the communication network, wherein each of said path comprises:

- a first analysis filter connected to receive an echo-containing signal originating from said local source, to be transmitted to said communication network after echo correction,
- a second analysis filter connected to receive an incoming signal originating from the communication network and directed to said loudspeaker means,
- an adaptive filter connected to receive an output of said second analysis filter and constructed to supply an estimated echo in the respective one of said sub-bands as defined by the respective first analysis filter and the respective second analysis filter, and
- a subtractor having an input connected to receive the echo containing signal in the respective sub-band and a subtractive input connected to receive said estimated echo in the respective input connected to receive said estimated echo in the respective sub-band,
- said echo canceller further comprising:
  - a synthesis filter connected to receive outputs of all said subtractors,
  - wherein said adaptive filters in those of the sub-bands having maximum incoming signal energy are arranged to carry out a fast version QR decomposition least squares algorithm on the incoming signal and are provided with means for varying a forgetting factor between a maximum value in the presence of high acoustical noise or double speech, and a smaller value in the presence of single speech, while said adaptive filters in sub-bands other than those having maximum incoming signal energy implement a different algorithm.

7. A canceller according to claim 6, characterized in that said means are provided for varying the forgetting factor between a minimum initial value that is greater than $(n-1)/n$ where n is the number of filter taps, and a maximum value close to 1, in the event of double speech being detected.

8. An echo canceller for use between a hands-free acoustical interface having a local source and loudspeaker means and a communication network for cancelling an acoustical echo due to acoustical coupling between said local source and said loudspeaker means, comprising a plurality of processing paths connected in parallel relation and each allocated to one of a plurality of mutually adjacent frequency sub-bands of a frequency spectrum band of a signal originating from said local source and to be delivered to the communication network, wherein each of said path comprises:

- a first analysis filter connected to receive an echo-containing signal originating from said local source, to be transmitted to said communication network after echo correction,
- a second analysis filter connected to receive an incoming signal originating from the communication network and directed to said loudspeaker means,
- an adaptive filter connected to receive an output of said second analysis filter and constructed to supply an estimated echo in the respective one of said sub-bands as defined by the respective first analysis filter and the respective second analysis filter, and
- a subtractor having an input connected to receive the echo containing signal in the respective sub-band and a subtractive input connected to receive said estimated echo in the respective sub-band,
- said echo canceller further comprising:
  - a synthesis filter connected to receive outputs of all said subtractors,
  - wherein said adaptive filters in those of the sub-bands having maximum incoming signal energy are arranged to carry out a fast version QR decomposition least squares algorithm on the incoming signal and are provided with means for automatically adjusting the order of recursive filters on the order of the sub-bands as an increase in function of energy in the signal $x(n)$ input to each sub-band.

9. An echo canceller according to claim 8, characterized in that said means for automatically adjusting the order of the filters reduces the order of the filter of a sub-band to zero when the energy of the incoming signal is zero in said sub-band, and sets the order of filters to a maximum value when the incoming signal exceeds a predetermined value, with the order of the filter at intermediate energies being adjusted by successive steps in application of a mean exponential relationship similar to that of the acoustical impulse response.

10. An echo canceller according to claim 8, wherein said adaptive filters in sub-bands other than those having maximum incoming signal energy implement an algorithm different from the fast version QR decomposition least squares algorithm.

* * * * *